(12) United States Patent
Tsunooka et al.

(10) Patent No.: US 9,512,796 B2
(45) Date of Patent: Dec. 6, 2016

(54) EXHAUST PURIFICATION APPARATUS FOR INTERNAL COMBUSTION ENGINE

(71) Applicants: Takashi Tsunooka, Gotenba (JP); Taisuke Yoshida, Susono (JP)

(72) Inventors: Takashi Tsunooka, Gotenba (JP); Taisuke Yoshida, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/766,303

(22) PCT Filed: Feb. 8, 2013

(86) PCT No.: PCT/JP2013/053096
§ 371 (c)(1),
(2) Date: Aug. 6, 2015

(87) PCT Pub. No.: WO2014/122778
PCT Pub. Date: Aug. 14, 2014

(65) Prior Publication Data
US 2015/0369153 A1 Dec. 24, 2015

(51) Int. Cl.
*F01N 3/025* (2006.01)
*F02D 41/02* (2006.01)
(Continued)

(52) U.S. Cl.
CPC ............ *F02D 41/029* (2013.01); *F01N 3/023* (2013.01); *F01N 3/0238* (2013.01); *F01N 3/035* (2013.01);
(Continued)

(58) Field of Classification Search
CPC .... F01N 3/023; F01N 3/0253; F01N 2550/02; F01N 2900/1624; F02D 41/029; F02D 41/123; F02D 2200/0812
See application file for complete search history.

(56) References Cited

U.S. PATENT DOCUMENTS

2005/0262827 A1 12/2005 Ichimoto et al.
2010/0205942 A1 8/2010 Fujiwara et al.

FOREIGN PATENT DOCUMENTS

JP H08-144814 A 6/1996
JP 2005-147082 A 6/2005
(Continued)

OTHER PUBLICATIONS

Machine translation of JP 2009-215933 A, accessed Mar. 4, 2016.*
Machine translation of JP H08-144814 A, accessed Mar. 4, 2016.*

*Primary Examiner* — Jonathan Matthias
(74) *Attorney, Agent, or Firm* — Andrews Kurth Kenyon LLP

(57) ABSTRACT

An object of the present invention is to increase opportunities that a filter is regenerated. Provided is an exhaust purification apparatus for a spark ignition type internal combustion engine, the apparatus including a catalyst and a filter in an exhaust passage of the internal combustion engine, and a control device that prohibits fuel cut when thermal degradation of the catalyst is predicted to advance in the case of implementing a fuel cut. The control device executes the fuel cut even where thermal degradation of the catalyst is predicted to advance, when regeneration of the filter, which is processing of removing particulate matter trapped in the filter, is needed.

8 Claims, 10 Drawing Sheets

(51) Int. Cl.
  *F01N 3/023* (2006.01)
  *F01N 3/10* (2006.01)
  *F01N 9/00* (2006.01)
  *F01N 13/00* (2010.01)
  *F01N 3/035* (2006.01)
  *F01N 11/00* (2006.01)

(52) U.S. Cl.
  CPC ............... *F01N 3/10* (2013.01); *F01N 9/002* (2013.01); *F01N 11/005* (2013.01); *F01N 13/009* (2014.06); *F01N 2550/02* (2013.01); *F01N 2550/04* (2013.01); *F01N 2900/1602* (2013.01); *F01N 2900/1624* (2013.01); *Y02T 10/47* (2013.01)

(56) References Cited

FOREIGN PATENT DOCUMENTS

| | | |
|---|---|---|
| JP | 2005-337171 A | 12/2005 |
| JP | 2009-074426 A | 4/2009 |
| JP | 2009-215933 A | 9/2009 |
| JP | 2010-180743 A | 8/2010 |
| JP | 2012-077694 A | 4/2012 |

* cited by examiner

EXHAUST PURIFICATION APPARATUS FOR INTERNAL COMBUSTION ENGINE

CROSS-REFERENCE TO RELATED APPLICATION

This is a national phase application based on the PCT International Patent Application No. PCT/JP2013/053096 filed Feb. 8, 2013, the entire contents of which are incorporated herein by reference.

TECHNICAL FIELD

The present invention relates to an exhaust purification apparatus for an internal combustion engine.

BACKGROUND ART

In internal combustion engines, a fuel cut is executed where a predetermined condition is fulfilled. The fuel cut is the processing of stopping the supply of fuel to the internal combustion engine. For example, the fuel cut is executed during deceleration. Further, where oxygen is supplied to a catalyst provided in the exhaust passage of the internal combustion engine when the catalyst temperature is high, thermal degradation of the catalyst advances. A method is known by which the fuel cut is prohibited so that no oxygen is supplied to the catalyst when the catalyst temperature is equal to or higher than a predetermined temperature (see, for example, Patent Literature 1).

In addition to the catalyst, a filter that traps particulate matter (referred to hereinbelow as PM) contained in exhaust gas can be also provided in the exhaust passage of an internal combustion engine. Where the PM amount trapped in the filter reaches a certain level, the processing of oxidizing and removing the PM is executed. This processing is filter regeneration. In order to oxidize the PM trapped in the filter, the filter temperature needs to be equal to or higher than a predetermined temperature and the concentration of oxygen in the filter needs to be equal to or higher than a predetermined concentration.

Meanwhile, the usual gasoline engine normally operates at a stoichiometric or rich air-fuel ratio. Therefore, there are few cases in which the oxygen concentration inside the filter becomes equal to or higher than the predetermined concentration, and such an event is limited, for example, to a fuel cut period. However, as disclosed in Patent Literature 1, where thermal degradation of the catalyst is to be suppressed, oxygen cannot be supplied to the filter. Therefore, the filter is difficult to regenerate. Even in a lean-burn gasoline engine, operation is sometimes executed at a stoichiometric or rich air-fuel ratio, and the filter can therefore be difficult to regenerate.

PRIOR ART LITERATURES

Patent Literatures

Patent Literature 1: Japanese Patent Application Publication No. 2005-147082.

Patent Literature 2: Japanese Patent Application Publication No. 2012-077694.

Patent Literature 3: Japanese Patent Application Publication No. 2010-180743.

SUMMARY OF THE INVENTION

Problems to be Solved by the Invention

The present invention has been created to resolve the above-described problems, and it is an object of the invention to increase opportunities that a filter is regenerated.

Means for Solving the Problems

In order to attain the abovementioned object, the present invention provides:

an exhaust purification apparatus for a spark ignition type internal combustion engine, the apparatus including:

a catalyst that is provided in an exhaust passage of the internal combustion engine and purifies exhaust gas;

a filter that is provided in the exhaust passage downstream of the catalyst and traps particulate matter contained in the exhaust gas; and a control device configured to prohibit a fuel cut, which is processing of stopping supply of fuel to the internal combustion engine, when thermal degradation of the catalyst is predicted to advance in the case of implementing the fuel cut, wherein the control device executes the fuel cut even where thermal degradation of the catalyst is predicted to advance, when regeneration of the filter, which is processing of removing particulate matter trapped in the filter, is needed.

Thus, when thermal degradation of the catalyst is predicted to advance, the advance of thermal degradation of the catalyst can be suppressed by implementing a fuel cut only when the filter needs to be regenerated. Further, the regeneration of the filter can be executed by implementing the fuel cut. The thermal degradation of the catalyst can be predicted to advance in the case of executing the fuel cut, for example, when the catalyst temperature reaches the temperature at which thermal degradation advances. Where a fuel cut is executed in such a case, thermal degradation of the catalyst advances. However, where the fuel cut is executed only when it is necessary to regenerate the filter, the advance degree of thermal degradation can be suppressed. Further, the filter needs to be regenerated, for example, when there is a risk of the filter being clogged and the internal combustion engine being adversely affected unless the regeneration of the filter is executed. In such a case, filter regeneration is prioritized by implementing the fuel cut. As a result, the opportunities that the filter is regenerated can be increased, and therefore the occurrence of clogging in the filter can be suppressed.

In the present invention, the control device can implement the fuel cut even where thermal degradation of the catalyst is predicted to advance, when the regeneration of the filter is needed and a temperature of the filter is equal to or higher than a temperature at which particulate matter can be removed.

In this case, where the filter temperature is lower than the temperature at which PM can be removed, the filter is not regenerated even when the fuel cut is executed. Further, in this case, thermal degradation of the catalyst is enhanced even when the fuel cut is executed. By contrast, the filter can be regenerated by implementing the fuel cut when the filter temperature is equal to or higher than the temperature at which PM can be removed.

In the present invention, the control device can prohibit the fuel cut in the case where thermal degradation of the catalyst has advanced and purification performance of the catalyst is lower than predetermined performance, even when the regeneration of the filter is needed.

In this case, where the purification performance of the catalyst decreases due to the execution of fuel cut, but thermal degradation has not advanced so much, the purification performance of the catalyst is sufficiently high even after the fuel cut has been executed. However, where the fuel cut is executed after thermal degradation has advanced, even when the purification performance of the catalyst is within the allowed range before the fuel cut, the purification performance of the catalyst can fall below the allowed range after the fuel cut. Thus, the predetermined performance is the purification performance of the catalyst such that the purification performance of the catalyst is within the allowed range even when the fuel cut is executed. Accordingly, where the fuel cut is executed when the purification performance of the catalyst is lower than the predetermined performance, the purification performance can fall below the allowed range. Therefore, the fuel cut is prohibited. As a result, the purification performance of the catalyst can be prevented from falling below the allowed range.

In the present invention, the control device can determine the purification performance of the catalyst on the basis of oxygen storage capacity of the catalyst.

Some catalysts have oxygen storage capacity. The oxygen storage capacity correlates with the purification performance of the catalyst. The oxygen storage capacity decreases with the advancement of thermal degradation of the catalyst. Therefore, the purification performance of the catalyst can be determined on the basis of the oxygen storage capacity. The oxygen storage capacity may be the maximum amount of oxygen stored by the catalyst.

In the present invention, when the catalyst temperature is equal to or higher than a predetermined temperature, the control device may predict the advance of thermal degradation of the catalyst in the case of executing the fuel cut, and the control device can set the predetermined temperature to a higher temperature as purification performance of the catalyst is higher.

The catalyst temperature is related to the advance of thermal degradation of the catalyst, and thermal degradation advances where a fuel cut is executed when the catalyst temperature has risen to a temperature at which thermal degradation advances. Further, the predetermined temperature is set at a low limit value of the temperature at which thermal degradation of the catalyst advances in the case of implementing the fuel cut. However, where thermal degradation of the catalyst has not advanced so much, the purification performance of the catalyst is sufficiently high even when thermal degradation thereafter advances. Meanwhile, when thermal degradation of the catalyst has advanced, it is desirable to suppress the advancement of thermal degradation. Therefore, the regeneration of the filter can be performed, while suppressing the excessive drop in the purification performance of the catalyst, by changing the upper limit temperature for implementing the fuel cut according to the purification performance of the catalyst.

In the present invention, even when the regeneration of the filter has been needed and the fuel cut has been executed, the control device can prohibit the fuel cut in the case where the regeneration of the filter has thereafter become not needed, or a temperature of the filter has thereafter become lower than a temperature at which particulate matter can be removed.

Where filter regeneration is executed, since the PM is oxidized and removed, the amount of PM accumulated in the filter decreases. Where the amount of PM accumulated in the filter is sufficiently decreased, it is not necessary to continue the regeneration of the filter. Thus, the fuel cut can be prohibited. As a result, the advancement of thermal degradation of the catalyst can be suppressed. Where the filter temperature becomes lower than the temperature at which PM can be removed in the course of filter regeneration, the PM cannot be oxidized anymore. Where the fuel cut is continued in this case, it only advances thermal degradation of the catalyst, and no filter regeneration is performed. Therefore, the advancement of the thermal degradation of the catalyst can be suppressed by prohibiting the fuel cut also when the filter temperature has decreased.

In the present invention, when the filter is predicted to be overheated in the case of implementing the fuel cut, the control device can prohibit the fuel cut even where the regeneration of the filter is needed.

Where the filter is regenerated, the filter temperature can rise due to the PM reaction heat. Where the amount of PM accumulated in the filter is large, the filter can be overheated. By contrast, where the fuel cut is prohibited when the filter is predicted to be overheated, the overheating of the filter can be suppressed. For example, because the increase in the filter temperature can be determined from the amount of PM accumulated in the filter, the fuel cut may be prohibited where the increased temperature of the filter is to cause the overheating.

In the present invention, even when the regeneration of the filter has been needed and the fuel cut has been executed, the control device can prohibit the fuel cut in the case where a temperature of the filter has thereafter reached a temperature at which the filter is predicted to be overheated.

Where the regeneration of the filter is executed, the filter temperature can rise due to PM reaction heat. Where the fuel cut is prohibited when the filter temperature reaches a temperature at which overheating can be predicted, subsequent increase in the filter temperature can be suppressed. Therefore, filter overheating can be suppressed. Further, the amount of PM accumulated on the filter can be reduced by implementing the fuel cut. The filter temperature at which the overheating can be predicted is a temperature at which the filter overheats where the fuel cut is continued, this temperature being lower than the temperature at which the filter overheats.

Advantageous Effect of the Invention

In accordance with the present invention, the opportunities that a filter is regenerated can be increased.

EMBODIMENTS FOR CARRYING OUT THE INVENTION

Modes for carrying out the invention will be explained hereinbelow in detail on the basis of embodiments thereof with reference to the drawings. The dimensions, materials, shapes, mutual arrangement and the like of constituent components described in the embodiments are not intended to limit the scope of the invention, unless specifically stated otherwise.

Embodiment 1

Figure 1:
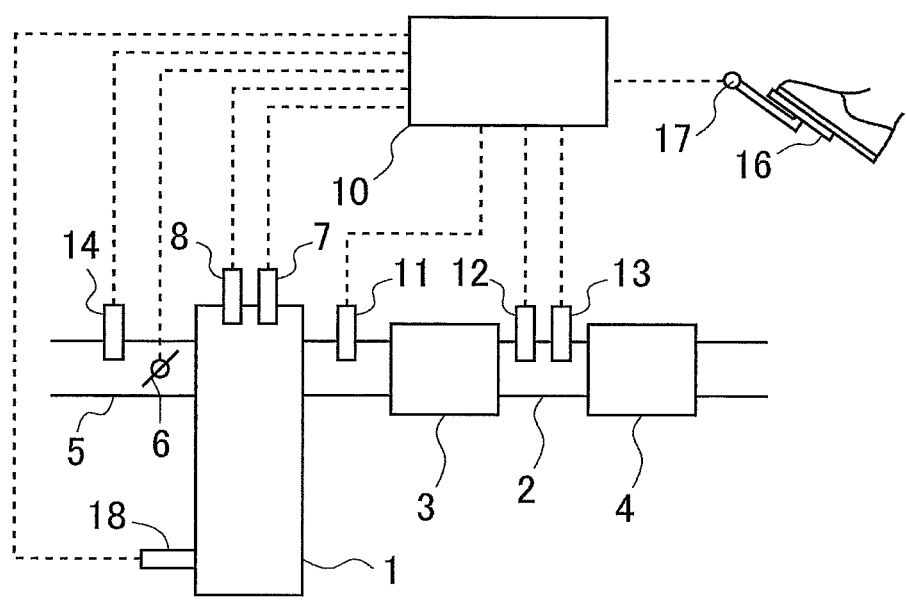
FIG. 1 illustrates the schematic configurations of the internal combustion engine according to the embodiments and the intake system and exhaust system thereof.

FIG. 1 illustrates the schematic configurations of the internal combustion engine according to the present embodiment and the intake system and exhaust system thereof. The internal combustion engine 1 depicted in FIG. 1 is a spark ignition type gasoline engine. The internal combustion engine 1 is installed, for example, on a vehicle.

An exhaust passage 2 is connected to the internal combustion engine 1. A catalyst 3 and a filter 4 are provided, in the order of description from an upstream side, in the exhaust passage 2.

The catalyst 3 serves to purify exhaust gas. The catalyst 3 may be, for example, a three-way catalyst, an oxidation catalyst, an NOx storage reduction catalyst, and an NOx selective reduction catalyst.

The filter 4 traps PM contained in the exhaust gas. For example, a three-way catalyst, an oxidation catalyst, an NOx storage reduction catalyst, and an NOx selective reduction catalyst may be supported on the filter 4. The catalyst supported on the filter 4 is different from the catalyst 3. In the present embodiment, the catalyst 3 corresponds to the catalyst in accordance with the present invention, and the catalyst supported on the filter 4 does not correspond to the catalyst in accordance with the present invention.

A first temperature sensor 11 that detects the exhaust gas temperature is provided in the exhaust passage 2 upstream of the catalyst 3. A second temperature sensor 12 that detects the exhaust gas temperature is provided in the exhaust passage 2 downstream of the catalyst 3 and upstream of the filter 4. The temperature of the catalyst 3 can be detected on the basis of the detection value of the first temperature sensor 11. Further, the temperature of the filter 4 can be detected on the basis of the detection value of the second temperature sensor 12. The temperatures of the catalyst 3 and filter 4 can be also estimated on the basis of the operation state of the internal combustion engine 1. An air-fuel ratio sensor 13 that detects the air-fuel ratio of the exhaust gas is provided in the exhaust passage 2 downstream of the catalyst 3 and upstream of the filter 4.

Further, an intake passage 5 is connected to the internal combustion engine 1. A throttle 6 that adjusts the intake air amount of the internal combustion engine 1 is provided in the intake passage 5. An air flow meter 14 that detects the intake air amount of the internal combustion engine 1 is mounted on the intake passage 5 upstream of the throttle 6.

A fuel injection valve 7 that supplies fuel to the internal combustion engine 1 is mounted on the internal combustion engine 1. The fuel injection valve 7 may inject the fuel into the cylinder of the internal combustion engine 1 or may inject the fuel into the intake passage 5. A sparkplug 8 that generates an electric spark inside the cylinder is provided in the internal combustion engine 1.

The internal combustion engine 1 configured in the above-described manner is also provided with an ECU 10 which is an electronic control unit for controlling the internal combustion engine 1. The ECU 10 controls the internal combustion engine 1 according to the operation conditions of the internal combustion engine 1 or a driver's request.

In addition to the abovementioned sensors, an accelerator depression amount sensor 17, which outputs an electric signal corresponding to the depression amount of an accelerator pedal 16 by the driver and detects the engine load, and a crank position sensor 18 that detects an engine revolution speed are connected by electric wiring to the ECU 10, and the output signals of those sensors are input to the ECU 10.

The throttle 6, the fuel injection valve 7, and the sparkplug 8 are also connected to the ECU 10 by electric wiring and those devices are controlled by the ECU 10.

The ECU 10 stops the supply of fuel from the fuel injection valve 7 when the internal combustion engine 1 is decelerated (this is also possible when the vehicle is decelerated). Thus, a fuel cut is executed. The fuel cut is executed, for example, when the accelerator depression amount is equal to or less than a predetermined value and the engine revolution speed is equal to or higher than a predetermined value.

Further, the ECU 10 prohibits the fuel cut when thermal degradation of the catalyst 3 is predicted to advance. As a result, the advance of thermal degradation of the catalyst 3 is suppressed. In this case, thermal degradation of the catalyst 3 advances when the temperature of the catalyst 3 is equal to or higher than the temperature at which thermal degradation advances and the concentration of oxygen in the catalyst 3 is equal to or higher than the concentration at which thermal degradation advances. Therefore, for example, when the temperature of the catalyst 3 is equal to or higher than the temperature at which thermal degradation advances, thermal degradation of the catalyst 3 can be predicted to advance in the case of executing the fuel cut. Further, since there is a correlation between the temperature of the catalyst 3 and past engine revolution speed and engine load, whether or not thermal degradation of the catalyst 3 is to advance when a fuel cut is executed can be predicted on the basis of, for example, the past engine revolution speed and engine load. Whether or not thermal degradation of the catalyst 3 is to advance can be also predicted on the basis of a vehicle speed.

The ECU 10 also estimates the PM amount that has accumulated on the filter 4 (referred to hereinbelow as "PM accumulation amount"). The PM accumulation amount may be estimated on the basis of the past engine revolution speed and engine load, or on the basis of the difference in exhaust gas pressure between the upstream and downstream of the filter 4. The PM accumulated on the filter 4 is oxidized and removed by making the temperature of the filter 4 equal to or higher than the temperature at which the PM is oxidized, and supplying oxygen to the filter 4.

In the present embodiment, a fuel cut is executed when the PM accumulation amount is equal to or greater than a predetermined amount at which the filter 4 needs to be regenerated and when thermal degradation of the catalyst 3 is predicted to advance. As a result, the regeneration of the filter 4 is enhanced, and therefore, clogging of the filter 4 can be suppressed. Further, although thermal degradation of the catalyst 3 is advanced by implementing a fuel cut, the purification capacity of the catalyst 3 is not decreased so much by one cycle of fuel cut. Meanwhile, where the filter 4 is not regenerated, the filter 4 can be clogged. Accordingly, in the present embodiment, the regeneration of the filter 4 is prioritized over the suppression of thermal degradation of the catalyst 3. The predetermined value of the PM accumulation amount is set such that where this value is reached or exceeded, the filter 4 is clogged unless the regeneration of the filter 4 is executed.

For example, it may be decided that the filter 4 needs to be regenerated when the difference in exhaust gas pressure between the upstream and downstream of the filter 4 is equal to or greater than a predetermined value. Alternatively, whether or not the filter 4 needs to be regenerated may be determined on the basis of the past engine revolution speed and engine load.

Figure 2:
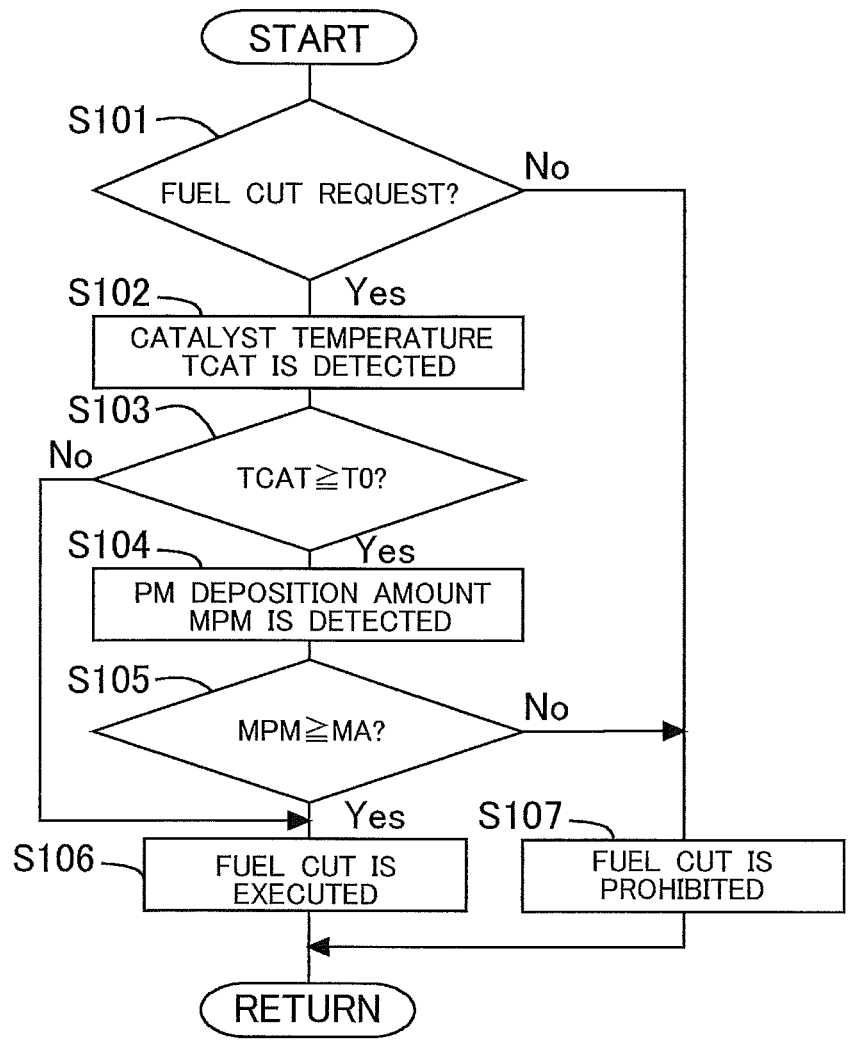
FIG. 2 is a flowchart of fuel cut control according to Embodiment 1.

FIG. 2 is a flowchart of fuel cut control according to the present embodiment. This routine is executed by the ECU 10 at every predetermined time. In the present embodiment, the ECU 10 that processes the flow depicted in FIG. 2 corresponds to the control device in accordance with the present invention.

In step S101, it is determined whether or not a fuel cut is requested. For example, it is determined that a fuel cut is requested when the engine revolution speed is equal to or greater than a predetermined revolution speed and the accelerator depression amount is equal to or less than a predetermined depression amount. The predetermined revolution speed and predetermined depression amount are set in advance by determining experimentally the optimum values. Where a positive determination is made in step S101, the processing flow advances to step S102, and where a negative determination is made, the processing flow advances to step S107 and the fuel cut is prohibited.

In step S102, a catalyst temperature TCAT is detected. The catalyst temperature TCAT is the temperature of the catalyst 3 and obtained on the basis of the detection value of the first temperature sensor 11.

In step S103, it is determined whether or not the catalyst temperature TCAT is equal to or higher than a predetermined temperature T0. The predetermined temperature T0 is a temperature at which thermal degradation of the catalyst 3 advances or can advance when a fuel cut is executed. Thus, in the present step, it is determined whether or not thermal degradation of the catalyst 3 advances or can advance when a fuel cut is executed. The predetermined temperature T0 may also be a temperature at which the catalyst 3 is overheated when a fuel cut is executed. The predetermined temperature T0 may be provided with a certain margin. The predetermined temperature T0 is determined experimentally in advance. Where a positive determination is made in step S103, the processing flow advances to step S104. Meanwhile, where a negative determination is made in step S103, thermal degradation of the catalyst 3 does not advance even when a fuel cut is executed. Therefore, the processing flow advances to step S106, and a fuel cut is executed. Where the fuel cut is executed, the filter 4 is regenerated.

In step S104, a PM accumulation amount MPM is detected. The PM accumulation amount MPM may be estimated from the past engine revolution speed and engine load, or may be estimated by using a differential pressure sensor.

In step S105, it is determined whether or not the PM accumulation amount MPM is equal to or greater than a predetermined amount MA. The predetermined amount MA is a PM accumulation amount at which the filter 4 needs to be regenerated. Thus, in the present step, it is determined whether or not the filter 4 needs to be regenerated. Where a positive determination is made in step S105, the processing flow advances to step S106 and a fuel cut is executed. As a result, the regeneration of the filter 4 is performed. Meanwhile, where a negative determination is made in step S105, the processing flow advances to step S107, and a fuel cut is prohibited. Thus, since the filter 4 needs not to be regenerated, the advancement of thermal degradation of the catalyst 3 is suppressed by prohibiting a fuel cut.

As explained hereinabove, according to the present embodiment, where the filter 4 needs to be regenerated, a fuel cut is executed even in a state in which thermal degradation of the catalyst 3 advances. As a result, oxygen is supplied to the filter 4 and the regeneration of the filter 4 is executed. Therefore, the occurrence of clogging in the filter 4 can be suppressed. Further, when the filter 4 needs not to be regenerated, a fuel cut is prohibited. Therefore, the advancement of thermal degradation of the catalyst 3 can be suppressed.

Embodiment 2

In the present embodiment, conditions under which a fuel cut is executed are different from those of Embodiment 1. Other features are the same as in Embodiment 1 and the explanation thereof is herein omitted.

In Embodiment 1, a fuel cut is executed when the PM accumulation amount MPM is equal to or greater than the predetermined amount MA. Meanwhile, in the present embodiment, a fuel cut is executed when the PM accumulation amount MPM is equal to or greater than the predetermined amount MA and the temperature of the filter 4 is equal to or higher than the temperature at which the PM can be oxidized.

Where oxygen is supplied to the filter 4, but the temperature of the filter 4 is not a temperature at which the PM can be oxidized, the PM is practically not oxidized. Where a fuel cut is executed in such a case, the regeneration of the filter 4 does not proceed, although thermal degradation of the catalyst 3 is advanced.

Accordingly, in the present embodiment, a fuel cut is executed when the PM accumulation amount MPM is equal to or greater than the predetermined amount MA and the filter temperature TPF is equal to or higher than the predetermined temperature TA. The predetermined temperature TA is a temperature at which the PM is oxidized. The predetermined temperature TA may be also a temperature at which the PM amount oxidized per unit time is at a lower limit value of an allowed range. A certain margin may be provided for the predetermined temperature TA, and this temperature may be higher than the lower limit value of the temperature at which the PM is oxidized.

Figure 3:
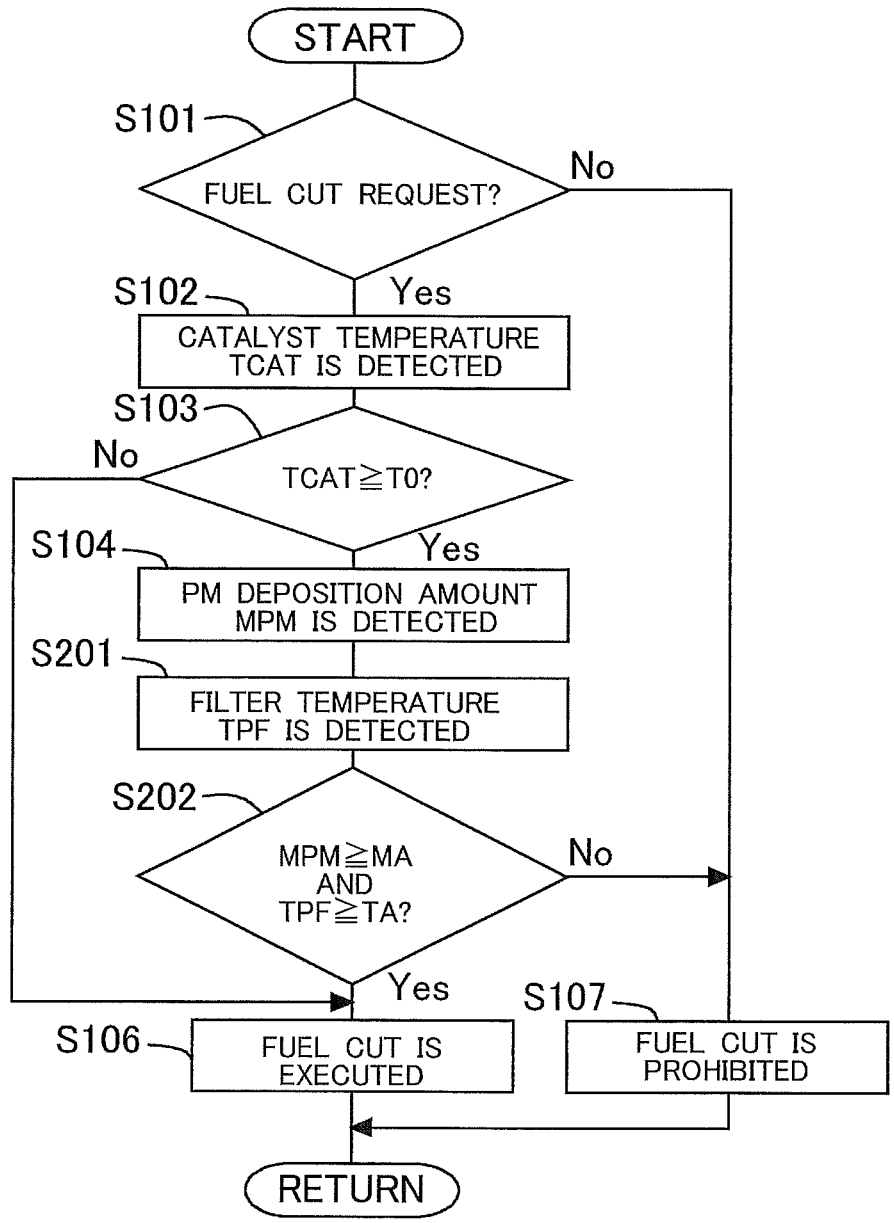
FIG. 3 is a flowchart of fuel cut control according to Embodiment 2.

FIG. 3 is a flowchart illustrating the flow of fuel cut control according to the present embodiment. This routine is executed by the ECU 10 at every predetermined time. The steps in which the processing is the same as in the aforementioned flowchart are assigned with like reference numerals and the explanation thereof is herein omitted. Further, in the present embodiment, the ECU 10 that processes the flow depicted in FIG. 3 corresponds to the control device in accordance with the present invention.

In the flow depicted in FIG. 3, where the processing of step S104 is completed, the processing flow advances to step S201. In step S201, the filter temperature TPF is detected. The filter temperature TPF is the temperature of the filter 4 and obtained on the basis of the detection value of the second temperature sensor 12.

In step S202, it is determined whether or not the PM accumulation amount MPM is equal to or greater than the predetermined amount MA and whether or not the filter temperature TPF is equal to or higher than the predetermined temperature TA. The predetermined amount MA is a PM accumulation amount at which the filter 4 needs to be regenerated, and the predetermined temperature TA is a temperature at which the PM is oxidized. Thus, in the present step, it is determined whether or not the filter 4 needs to be regenerated and whether or not the PM is oxidized when oxygen is supplied to the filter 4. Where a positive determination is made in step S202, the processing flow advances to step S106 and a fuel cut is executed. As a result, the regeneration of the filter 4 is performed. Meanwhile, where a negative determination is made in step S202, the processing flow advances to step S107 and a fuel cut is prohibited. Thus, since the filter 4 needs not to be regenerated or the PM cannot be oxidized, thermal degradation of the catalyst 3 is suppressed by prohibiting the fuel cut.

As explained hereinabove, according to the present embodiment, where the filter 4 needs to be regenerated and the PM can be oxidized, a fuel cut is executed even in a state in which thermal degradation of the catalyst 3 advances. As a result, the regeneration of the filter 4 is executed, and therefore, the occurrence of clogging in the filter 4 can be suppressed. Further, when the filter 4 needs not to be regenerated and the PM is not oxidized, a fuel cut is prohibited. Therefore, the advancement of thermal degradation of the catalyst 3 can be suppressed.

Embodiment 3

In the present embodiment, conditions under which a fuel cut is executed are different from those of the aforementioned embodiments. Other features are the same as in Embodiment 1 and the explanation thereof is herein omitted.

In Embodiment 1, a fuel cut is executed when the PM accumulation amount MPM is equal to or greater than the predetermined amount MA. Further, in Embodiment 2, a fuel cut is executed when the PM accumulation amount MPM is equal to or greater than the predetermined amount MA and the filter temperature TPF is equal to or higher than the predetermined temperature TA. Meanwhile, in the present embodiment, the fuel cut is prohibited, even when the above-described conditions for implementing the fuel cut are fulfilled, to suppress additional decrease in purification performance when the purification performance has become less than predetermined performance due to a high degree of thermal degradation of the catalyst 3. The predetermined performance, as referred to herein, is a purification performance such that the purification performance of the catalyst 3 is within an allowed range even when a fuel cut is performed.

For example, where the purification ratio of hazardous substances is less than a predetermined ratio, it is determined that the purification performance is less than the predetermined performance. The predetermined ratio is a purification ratio at which the purification ratio of hazardous substances becomes less than an allowed value when a fuel cut is executed. This value can be determined in advance experimentally or by simulation. The purification ratio is also the proportion of the amount of hazardous substance purified in the catalyst 3 in the amount of hazardous substances flowing to the catalyst 3. Examples of the hazardous substances include HC, CO, NOx. It may be assumed that the purification performance of the catalyst 3 is less than the predetermined performance when the degree of thermal degradation of the catalyst 3 is larger than a predetermined degree.

The purification performance of the catalyst 3 may be also determined according, for example, to the oxygen storage capacity of the catalyst 3. In this case, the fuel cut is prohibited when the oxygen storage capacity of the catalyst 3 is less than a predetermined capacity. The predetermined capacity, as referred to herein, is an oxygen storage capacity at which the oxygen storage capacity of the catalyst 3 is below the allowed range when a fuel cut is executed. For example, when the catalyst 3 is a three-way catalyst, oxygen contained in the exhaust gas is stored and NOx is reduced when the air-fuel ratio of the exhaust gas is higher than the stoichiometric air-fuel ratio, that is, at a lean air-fuel ratio. Further, when the air-fuel ratio of exhaust gas is less than the stoichiometric air-fuel ratio, that is, at a rich air-fuel ratio, the stored oxygen is released and HC and CO contained in the exhaust gas are oxidized. Oxygen storage capacity then decreases as thermal degradation of the catalyst 3 advances, and the amount of oxygen stored in operation at a lean air-fuel ratio is decreased.

The oxygen storage capacity can be determined, for example, by the detection value of the air-fuel ratio sensor 13. For example, since there is a correlation between the oxygen storage amount and the period of time from when the air-fuel ratio of the exhaust gas flowing to the catalyst 3 changes from a rich air-fuel ratio to a lean air-fuel ratio until when the air fuel ratio of the exhaust gas flowing out of the catalyst 3 changes to a lean air-fuel ratio, the oxygen storage amount can be determined on the basis of this period of time. It may be assumed that the oxygen storage capacity is less than the predetermined capacity when the oxygen storage amount is less than the predetermined amount.

The purification performance of the catalyst 3 may be also estimated on the basis of past engine revolution speed and engine load. Further, the purification performance of the catalyst 3 may be also estimated from past temperature of the catalyst 3.

In Embodiment 1 and Embodiment 2, conditions for implementing a fuel cut are established regardless of the purification performance of the catalyst 3. Therefore, the purification performance of the catalyst 3 can become too low when a fuel cut is executed. By contrast, where the fuel cut is prohibited in response to the purification performance of the catalyst 3, the advance of thermal degradation of the catalyst 3 can be suppressed, and therefore the purification performance of the catalyst 3 can be prevented from becoming too low.

Figure 4:
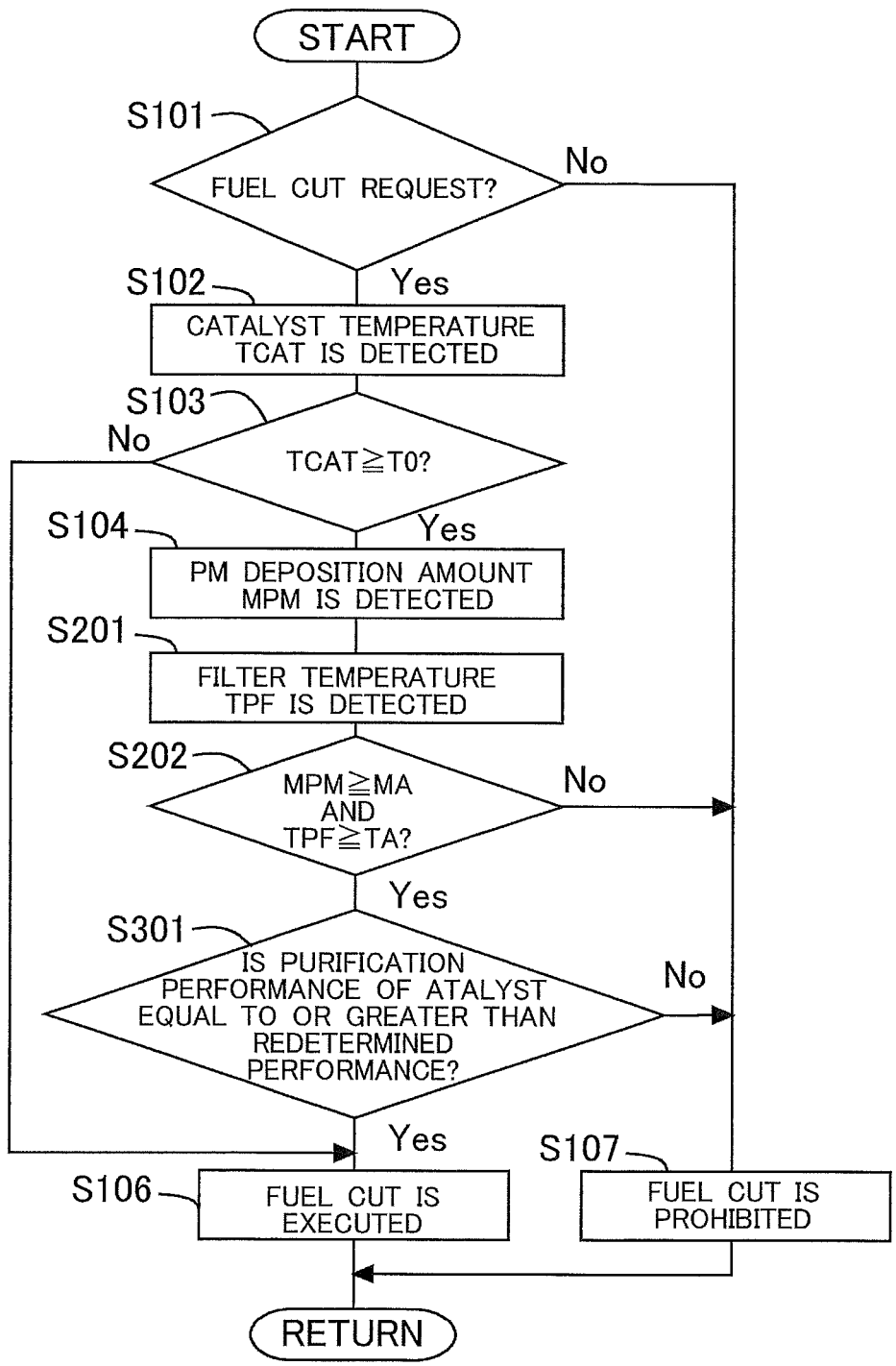
FIG. 4 is a flowchart of fuel cut control according to Embodiment 3.

FIG. 4 is a flowchart illustrating the flow of fuel cut control according to the present embodiment. This routine is executed by the ECU 10 at every predetermined time. The steps in which the processing is the same as in the aforementioned flowcharts are assigned with like reference numerals and the explanation thereof is herein omitted. Further, in the present embodiment, the ECU 10 that processes the flow depicted in FIG. 4 corresponds to the control device in accordance with the present invention.

In the flow depicted in FIG. 4, where a positive determination is made in step S202, the processing flow advances to step S301. In step S301, it is determined whether or not the purification performance of the catalyst 3 is equal to or greater than the predetermined performance. The predetermined performance is purification performance at which the purification performance of the catalyst 3 is in the allowed range even when a fuel cut is executed. For example, where the purification ratio of HC, CO, or NOx is equal to or higher than a predetermined ratio, it is determined that the purification performance of the catalyst 3 is equal to or greater than the predetermined performance. The predetermined ratio is determined experimentally or by simulation. When a positive determination is made in step S301, the processing flow advances to step S106 and a fuel cut is executed. Thus, since the purification performance of the catalyst 3 does not decrease below the allowed range even though a fuel cut is executed, the regeneration of the filter 4 by fuel cut execution is prioritized. Meanwhile, where a negative determination is made in step S301, the processing flow advances to step S107 and the fuel cut is prohibited. Thus, where a fuel cut is executed, the purification performance of the catalyst 3 can decrease below the allowed range. Therefore, the fuel cut is stopped and the decrease in purification performance of the catalyst 3 is suppressed.

The aforementioned step S105 may be executed instead of step S201 and step S202 depicted in FIG. 4.

Figure 5:
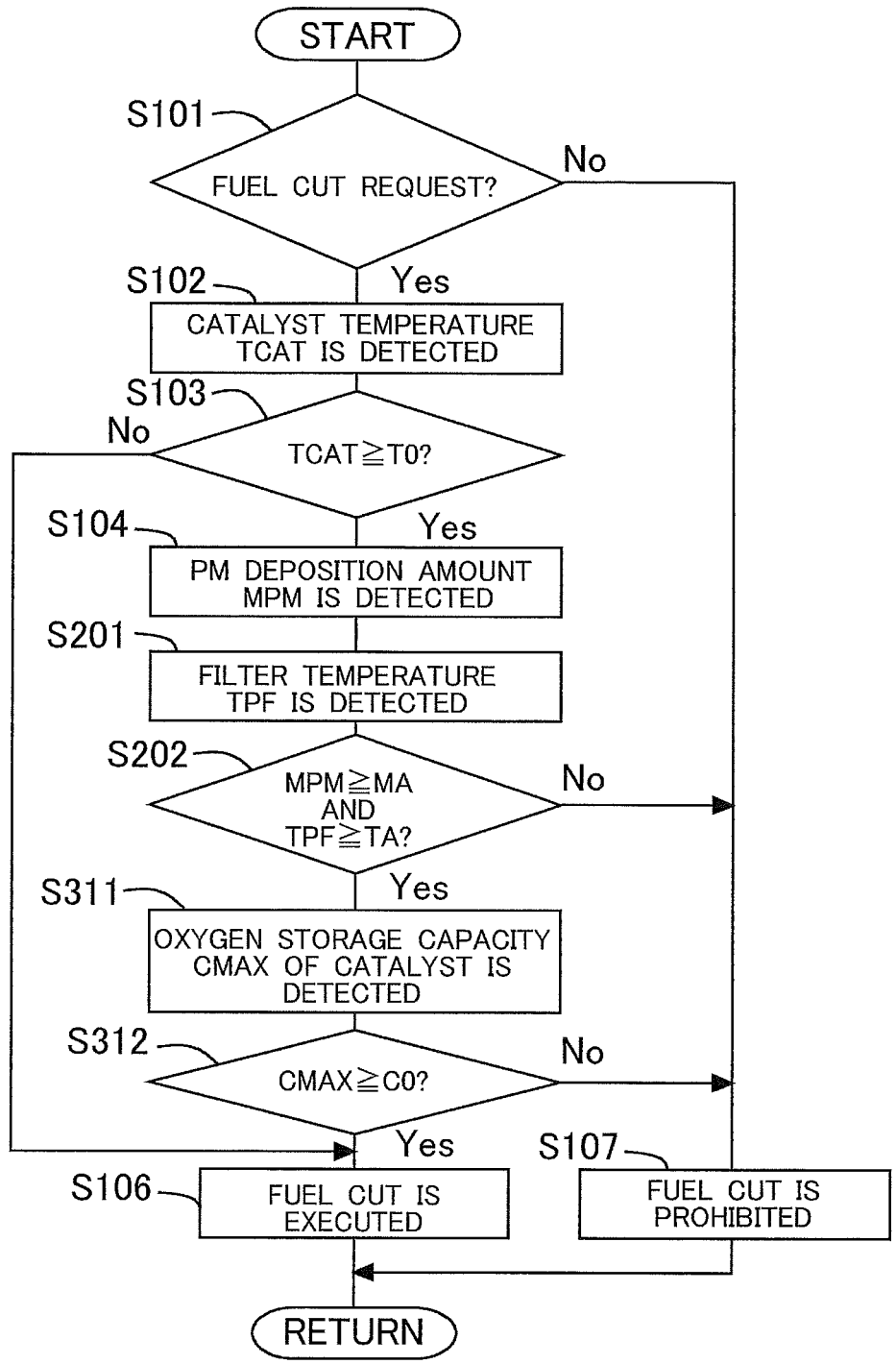
FIG. 5 is another flowchart of fuel cut control according to Embodiment 3.

Further, step S311 and step S312 depicted in FIG. 5 may be executed instead of step S301 depicted in FIG. 4. FIG. 5 is another flowchart illustrating the flow of fuel cut control according to the present embodiment. This routine is executed by the ECU 10 at every predetermined time. The steps in which the processing is the same as in the aforementioned flowchart are assigned with like reference numerals and the explanation thereof is herein omitted.

In the flowchart depicted in FIG. 5, where a positive determination is made in step S202, the processing flow advances to step S311. In step S311, the oxygen storage capacity CMAX of the catalyst 3 is detected. The oxygen storage capacity CMAX is a maximum value of the oxygen storage amount in the catalyst 3 and is calculated on the basis of the detection value of the air-fuel ratio sensor 13.

In step S312, it is determined whether or not the oxygen storage capacity CMAX of the catalyst 3 is equal to or higher than a predetermined capacity CO. The predetermined capacity CO is a lower limit value of an oxygen storage capacity at which the oxygen storage capacity falls in the allowed range even when a fuel cut is executed. The predetermined capacity CO is determined experimentally or by simulation. Where a positive determination is made in step S312, the processing flow advances to step S106 and a fuel cut is executed. Thus, since the oxygen storage capacity of the catalyst 3 does not become less than the allowed range even though the fuel cut is executed, the regeneration of the filter 4 by fuel cut execution is prioritized. Meanwhile, where a negative determination is made in step S312, the processing flow advances to step S107 and the fuel cut is prohibited. Thus, where a fuel cut is executed, the oxygen storage capacity of the catalyst 3 can become less than the allowed range. Therefore, the fuel cut is prohibited and the decrease in oxygen storage capacity of the catalyst 3 is suppressed.

As explained hereinabove, according to the present embodiment, the fuel cut is executed while the oxygen storage capacity of the catalyst 3 is in the allowed range. As a result, regeneration of the filter 4 is executed. Therefore, the occurrence of clogging in the filter 4 can be suppressed. Further, when there is a risk of the oxygen storage capacity of the catalyst 3 falling below the allowed range, the fuel cut is prohibited. Therefore, the advance of thermal degradation of the catalyst 3 can be suppressed.

Embodiment 4

In the aforementioned embodiments, a fuel cut is prohibited when the catalyst temperature TCAT is equal to or higher than a predetermined temperature T0, and the predetermined temperature T0 is a constant value. Meanwhile, in the present embodiment, the predetermined temperature T0 is changed according to the purification performance of the catalyst 3. Since other features are the same as in Embodiment 1, the explanation thereof is herein omitted.

Where the purification performance of the catalyst 3 is high, the purification performance is unlikely to fall below the allowed range even when a fuel cut is executed. Thus, where the purification performance of the catalyst 3 is high, tolerance with respect to thermal degradation is high. Accordingly, in the present embodiment, the predetermined temperature T0 is set higher for higher purification performance of the catalyst 3 and the predetermined temperature T0 is set lower for lower purification performance of the catalyst 3. As a result, where the purification performance of the catalyst 3 is high, a fuel cut can be executed at a higher temperature of the catalyst 3. As a consequence, regeneration of the filter 4 is enhanced.

Figure 6:
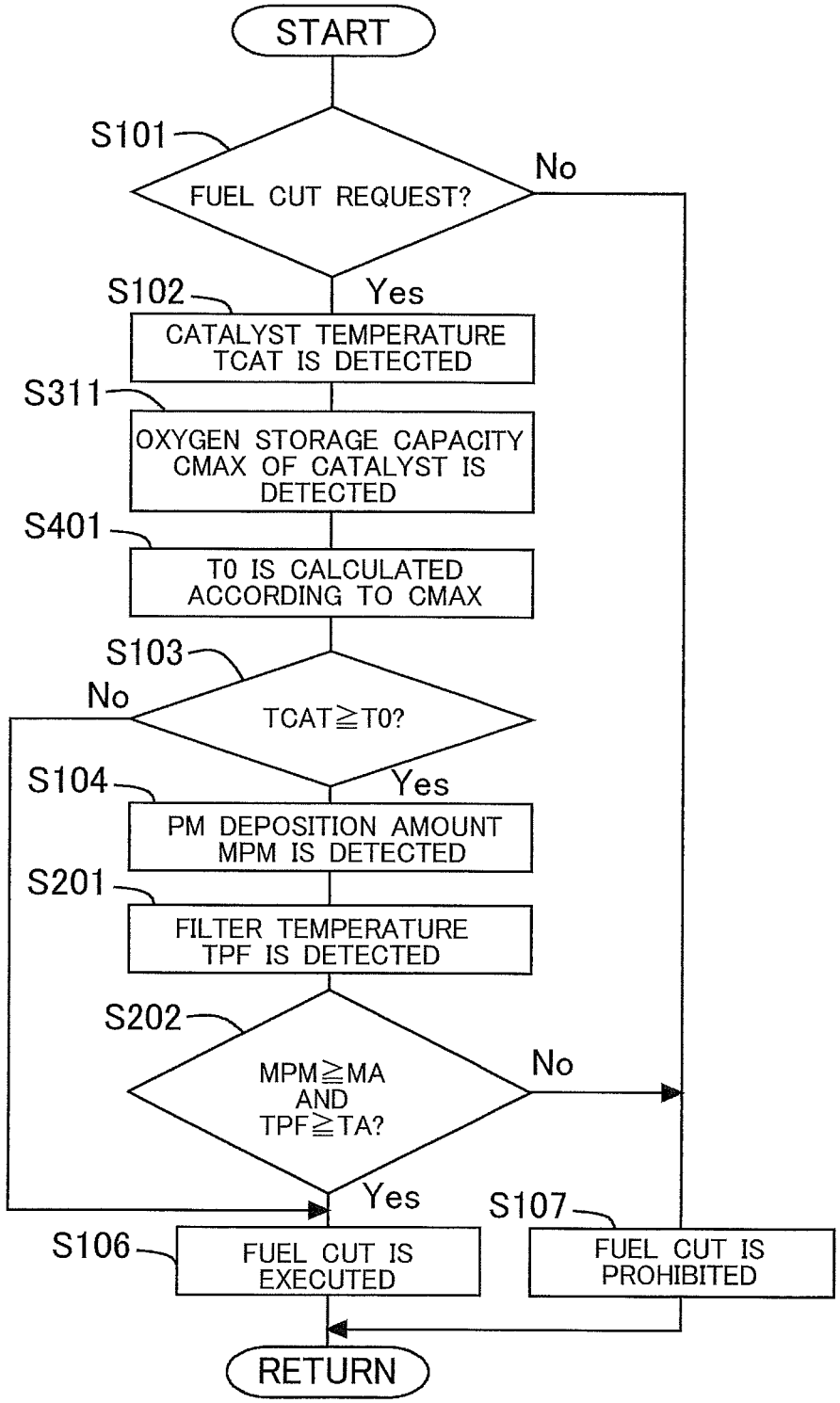
FIG. 6 is a flowchart of fuel cut control according to Embodiment 4.

FIG. 6 is a flowchart illustrating the flow of fuel cut control according to the present embodiment. This routine is executed by the ECU 10 at every predetermined time. The steps in which the processing is the same as in the aforementioned flowcharts are assigned with like reference numerals and the explanation thereof is herein omitted. Further, in the present embodiment, the ECU 10 that processes the flow depicted in FIG. 6 corresponds to the control device in accordance with the present invention.

In the flowchart depicted in FIG. 6, the processing of step S311 is performed after that of step S102. The processing flow then advances to step S401. In step S401, the predetermined temperature T0 is calculated on the basis of the oxygen storage capacity CMAX of the catalyst 3 which is calculated in step S311.

Figure 7:
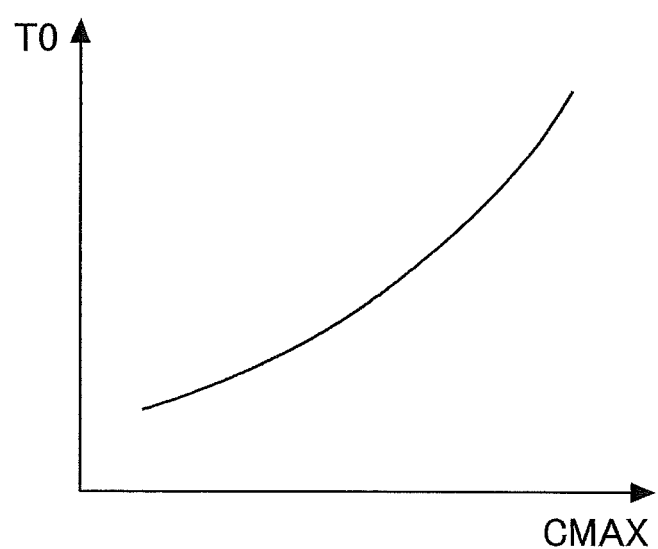
FIG. 7 illustrates the relationship between the oxygen storage capacity CMAX of a catalyst and a predetermined temperature T0.

FIG. 7 shows the relationship between the oxygen storage capacity CMAX of the catalyst 3 and the predetermined temperature T0. Thus, since the purification performance of the catalyst 3 is higher at a higher oxygen storage capacity CMAX of the catalyst 3, a high predetermined temperature T0 is set. This relationship is determined in advance experimentally or by simulation and stored in the ECU 10. Then, in step S103, the determination based on the predetermined temperature T0 calculated in step S401 is performed. As a result, the higher is the purification performance of the catalyst 3, the higher is the temperature at which the fuel cut can be executed.

The aforementioned step S105 may be executed instead of step S201 and step S202 depicted in FIG. 6.

As explained hereinabove, in accordance with the present embodiment, since the temperature at which a fuel cut can be executed changes according to the purification performance of the catalyst 3, the regeneration of the filter 4 can be prioritized, for example, when the purification performance of the catalyst 3 is high. As a result, the occurrence of clogging in the filter 4 can be suppressed. Further, when the purification performance of the catalyst 3 is low, the fuel cut is prohibited at a lower temperature of the catalyst 3. Therefore, the advance of thermal degradation of the catalyst 3 can be suppressed.

Embodiment 5

In the present embodiment, when the conditions for prohibiting a fuel cut are fulfilled in the course of implementing the fuel cut, the fuel cut is ended. Other features are the same as in Embodiment 1, and the explanation thereof is herein omitted.

In this case, where the PM accumulation amount MPM becomes equal to or higher than the predetermined amount MA and a fuel cut is executed, the PM accumulation amount MPM decreases. Further, it is not necessary to implement the fuel cut unless the PM accumulation amount MPM has become sufficiently low. Where a fuel cut is prohibited at this time, the advance of thermal degradation of the catalyst 3 can be suppressed.

Even when the filter temperature TPF becomes equal to or higher than the predetermined temperature TA and a fuel cut is executed, the filter temperature TPF sometimes becomes less than the predetermined temperature TA as the fuel cut is executed. In this case, the PM accumulation amount MPM practically does not decrease even when the fuel cut is continued. Thus, thermal degradation of the catalyst 3 advances without the regeneration of the filter 4. Where the fuel cut is prohibited in this case, the advance of thermal degradation of the catalyst 3 can be suppressed.

Accordingly, in the present embodiment, the fuel cut is prohibited when the PM accumulation amount MPM becomes less than the predetermined amount MA as the fuel cut is executed, or when the filter temperature TPF becomes less than the predetermined temperature TA.

Figure 8:
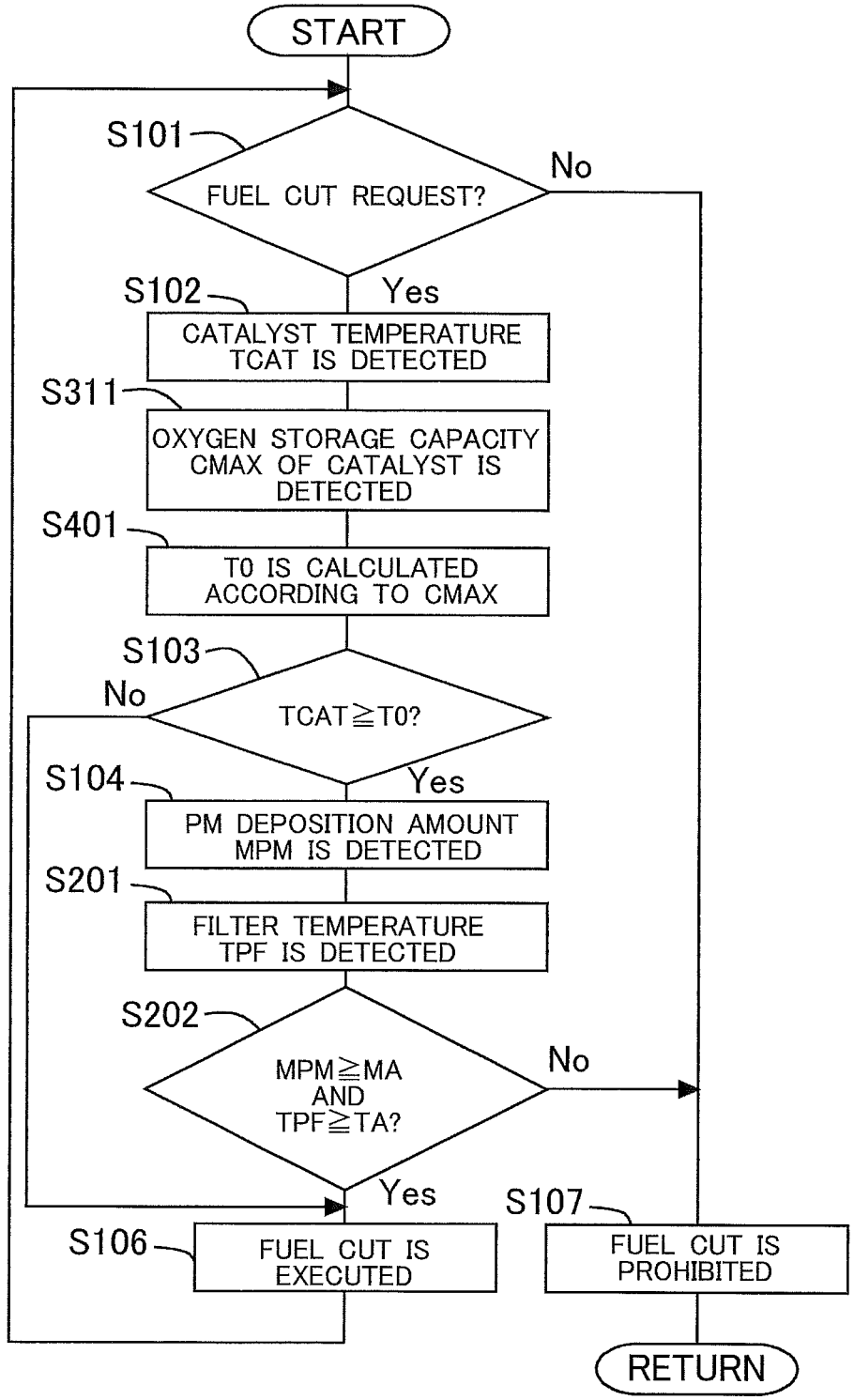
FIG. 8 is a flowchart of fuel cut control according to Embodiment 5.

FIG. 8 is a flowchart illustrating the flow of fuel cut control according to the present embodiment. This routine is executed by the ECU 10 at every predetermined time. The steps in which the processing is the same as in the aforementioned flowcharts are assigned with like reference numerals and the explanation thereof is herein omitted. Further, in the present embodiment, the ECU 10 that processes the flow depicted in FIG. 8 corresponds to the control device in accordance with the present invention.

In the flowchart depicted in FIG. 8, the processing returns to step S101 after the flow cut has been executed in step S106. As a result, a negative determination is made in step S202, the processing advances to step S107, and the fuel cut is prohibited when the PM accumulation amount MPM becomes less than the predetermined amount MA as the fuel cut is executed, or when the filter temperature TPF becomes less than the predetermined temperature TA.

The aforementioned step S105 may be executed instead of step S201 and step S202 depicted in FIG. 8.

As explained hereinabove, in accordance with the present embodiment, the unnecessary advancement of thermal degradation of the catalyst 3 can be suppressed.

Embodiment 6

In the present embodiment, a fuel cut is prohibited when the filter 4 can be overheated in the course of implementing the fuel cut. Other features are the same as in Embodiment 1, and the explanation thereof is herein omitted.

When the filter 4 is regenerated, PM reaction heat is generated. As a result, the temperature of the filter 4 rises. Further, depending on the PM accumulation amount MPM or the filter temperature TPF before the regeneration of the filter 4, the filter 4 can be overheated as the fuel cut is executed.

Accordingly, in the present embodiment, when there is a risk of the filter 4 overheating as the fuel cut is executed, the fuel cut is prohibited. Whether or not the filter 4 is to be overheated when the fuel cut is presumed to be executed may be determined before the fuel cut is actually executed. When the filter temperature TPF is detected to have risen such that the filter temperature TPF can cause overheating in the course of actually implementing a fuel cut, the fuel cut is ended.

Figure 9:
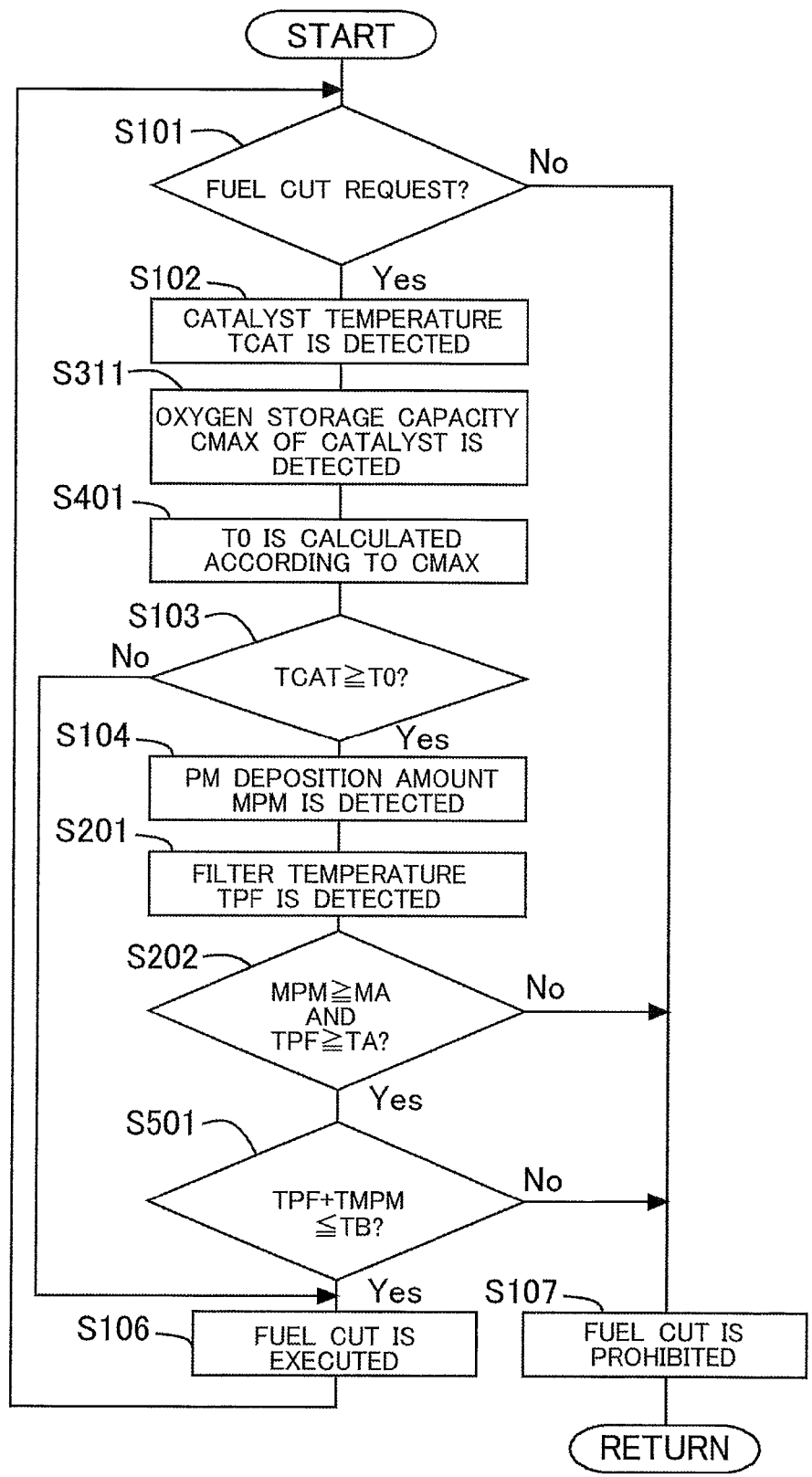
FIG. 9 is a flowchart of fuel cut control according to Embodiment 6.

FIG. 9 is a flowchart illustrating the flow of fuel cut control according to the present embodiment. This routine is executed by the ECU 10 at every predetermined time. The steps in which the processing is the same as in the aforementioned flowcharts are assigned with like reference numerals and the explanation thereof is herein omitted. Further, in the present embodiment, the ECU 10 that processes the flow depicted in FIG. 9 corresponds to the control device in accordance with the present invention.

In the flowchart depicted in FIG. 9, where a positive determination is made in step S202, the processing flow advances to step S501. In step S501, it is determined whether or not the temperature obtained by adding a temperature rise amount TMPM at the time a fuel cut is executed to the present filter temperature TPF is equal to or lower than a heat resistance temperature TB of the filter 4. The temperature rise amount TMPM at the time a fuel cut is executed is the rise amount of temperature calculated on the basis of the PM accumulation amount MPM. This is the rise amount of temperature when the entire PM accumulated on the filter 4 is oxidized. The relationship between the PM accumulation amount MPM and the temperature rise amount TMPM is determined in advance experimentally or by simulation and stored in the ECU 10. The heat resistance temperature TB of the filter 4 is also determined in advance experimentally or by simulation, and the heat resistance temperature TB may be provided with a certain margin. Where a positive determination is made in step S501, the processing flow advances to step S106. Meanwhile, where a negative determination is made, the processing flow advances to step S107.

Accordingly, whether or not the filter 4 is to be overheated can be determined before the fuel cut is actually executed.

Figure 10:
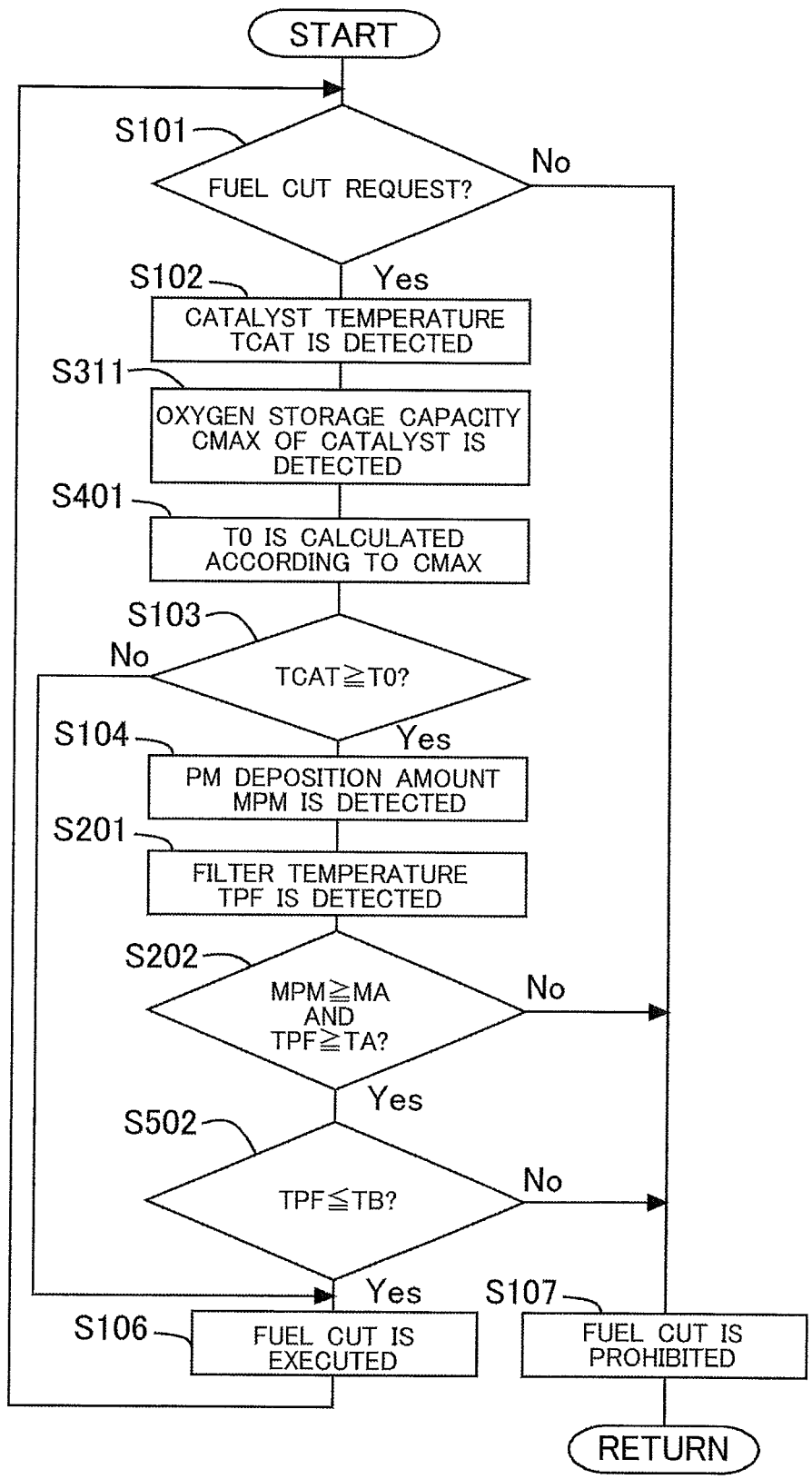
FIG. 10 is another flowchart of fuel cut control according to Embodiment 6.

FIG. 10 is another flowchart illustrating the flow of fuel cut control according to the present embodiment. This routine is executed by the ECU 10 at every predetermined time. The steps in which the processing is the same as in the aforementioned flowcharts are assigned with like reference numerals and the explanation thereof is herein omitted.

In the flowchart depicted in FIG. 10, where a positive determination is made in step S202, the processing flow advances to step S502. In step 502, it is determined whether or not the present filter temperature TPF is equal to or lower than the heat resistance temperature TB of the filter 4. Where a positive determination is made in step S502, the processing flow advances to step S106. Meanwhile, where a negative determination is made, the processing flow advances to step S107.

Accordingly, whether or not the filter 4 will be overheated can be determined in the course of actually implementing the fuel cut. As a result, the PM accumulation amount MPM can be decreased before the filter 4 can be overheated.

The aforementioned step S105 may be executed instead of step S201 and step S202 depicted in FIGS. 9 and 10.

As explained hereinabove, in accordance with the present embodiment, the regeneration of the filter 4 can be executed while suppressing the overheating of the filter 4.

DESCRIPTION OF THE REFERENCE SIGNS

1: internal combustion engine
2: exhaust passage
3: catalyst
4: filter
5: intake passage
6: throttle
7: fuel injection valve 8: sparkplug
10: ECU
11: first temperature sensor
12: second temperature sensor
13: air-fuel ratio sensor
14: air flow meter
16: accelerator pedal
17: accelerator depression amount sensor
18: crank position sensor

The invention claimed is:

1. An exhaust purification apparatus for a spark ignition type internal combustion engine, the apparatus comprising:
   a catalyst that is provided in an exhaust passage of the internal combustion engine and purifies exhaust gas;
   a filter that is provided in the exhaust passage downstream of the catalyst and traps particulate matter contained in the exhaust gas; and
   a controller including a processor and configured to receive input signals from a plurality of sensors located within the internal combustion engine, the controller configured to prohibit a fuel cut, which is processing of stopping supply of fuel to the internal combustion engine, when thermal degradation of the catalyst is predicted to advance in the case of implementing the fuel cut, wherein
   the controller is further configured to execute the fuel cut even where thermal degradation of the catalyst is predicted to advance, when regeneration of the filter, which is processing of removing particulate matter trapped in the filter, is needed.

2. The exhaust purification apparatus for an internal combustion engine according to claim 1, wherein the controller is further configured to execute the fuel cut even where thermal degradation of the catalyst is predicted to advance, when the regeneration of the filter is needed and a temperature of the filter is equal to or higher than a temperature at which particulate matter can be removed.

3. The exhaust purification apparatus for an internal combustion engine according to claim 1, wherein the controller is further configured to prohibit the fuel cut in the case where thermal degradation of the catalyst has advanced and purification performance of the catalyst is lower than predetermined performance, even when the regeneration of the filter is needed.

4. The exhaust purification apparatus for an internal combustion engine according to claim 3, wherein the controller is further configured to determined the purification performance of the catalyst on the basis of oxygen storage capacity of the catalyst.

5. The exhaust purification apparatus for an internal combustion engine according to claim 1, wherein, when the catalyst temperature is equal to or higher than a predetermined temperature, the controller is further configured to predict the advance of thermal degradation of the catalyst in the case of executing the fuel cut, and the control device sets the predetermined temperature to a higher temperature as purification performance of the catalyst is higher.

6. The exhaust purification apparatus for an internal combustion engine according to claim 1, wherein even when the regeneration of the filter has been needed and the fuel cut has been executed, the controller is further configured to prohibit the fuel cut in the case where the regeneration of the filter has thereafter become not needed, or a temperature of the filter has thereafter become lower than a temperature at which particulate matter can be removed.

7. The exhaust purification apparatus for an internal combustion engine according to claim 1, wherein when the filter is predicted to be overheated in the case of implementing the fuel cut, the controller is further configured to prohibit the fuel cut even where the regeneration of the filter is needed.

8. The exhaust purification apparatus for an internal combustion engine according to claim 1, wherein even when the regeneration of the filter has been needed and the fuel cut has been executed, the controller is further configured to prohibit the fuel cut in the case where a temperature of the filter has thereafter reached a temperature at which the filter is predicted to be overheated.

* * * * *

UNITED STATES PATENT AND TRADEMARK OFFICE
CERTIFICATE OF CORRECTION

PATENT NO. : 9,512,796 B2  
APPLICATION NO. : 14/766303  
DATED : December 6, 2016  
INVENTOR(S) : T. Tsunooka et al.

It is certified that error appears in the above-identified patent and that said Letters Patent is hereby corrected as shown below:

In the Specification

At Column 11, Line 36, change "capacity CO" to -- capacity C0 --.

At Column 11, Line 37, change "capacity CO is" to -- capacity C0 is --.

At Column 11, Line 40, change "capacity CO is" to -- capacity C0 is --.

In the Claims

At Column 16, Line 7, Claim 4, change "to determined" to -- to determine --.

Signed and Sealed this  
Thirtieth Day of May, 2017

Michelle K. Lee  
*Director of the United States Patent and Trademark Office*